(12) United States Patent
Minard (10) Patent No.: US 11,118,841 B2
(45) Date of Patent: Sep. 14, 2021

(54) CYLINDRICAL HEAT EXCHANGER

(71) Applicant: TAYLOR COMMERICAL FOODSERVICE, LLC, Rockton, IL (US)

(72) Inventor: James J. Minard, Roscoe, IL (US)

(73) Assignee: TAYLOR COMMERCIAL FOODSERVICE, LLC, Rockton, IL (US)

( * ) Notice: Subject to any disclaimer, the term of this patent is extended or adjusted under 35 U.S.C. 154(b) by 14 days.

(21) Appl. No.: 16/307,365

(22) PCT Filed: Jun. 8, 2017

(86) PCT No.: PCT/US2017/036491
§ 371 (c)(1),
(2) Date: Dec. 5, 2018

(87) PCT Pub. No.: WO2017/214357
PCT Pub. Date: Dec. 14, 2017

(65) Prior Publication Data
US 2019/0346210 A1 Nov. 14, 2019

Related U.S. Application Data

(60) Provisional application No. 62/347,949, filed on Jun. 9, 2016.

(51) Int. Cl.
*F28D 7/10* (2006.01)
*A23G 9/22* (2006.01)
(Continued)

(52) U.S. Cl.
CPC .............. *F28D 7/106* (2013.01); *A23G 9/222* (2013.01); *A23G 9/281* (2013.01); *F28F 1/105* (2013.01); *F28F 1/38* (2013.01); *A23G 9/12* (2013.01)

(58) Field of Classification Search
CPC ... F28D 7/106; F28F 1/38; F28F 1/105; F28F 1/36; A23G 9/281; A23G 9/222; A23G 9/12
See application file for complete search history.

(56) References Cited

U.S. PATENT DOCUMENTS 3,197,975 A   8/1965   Boling
3,304,737 A * 2/1967   Strutynski ................ A23G 9/20
                                                    62/179
(Continued)

FOREIGN PATENT DOCUMENTS

CN        1266976 A    9/2000
CN      201242374 Y    5/2009
(Continued)

OTHER PUBLICATIONS

International Preliminary Report on Patentability and Written Opinion of the International Searching Authority for PCT/US2017/036491, dated Dec. 11, 2018, 9 pp.
(Continued)

*Primary Examiner* — Emmanuel E Duke
(74) *Attorney, Agent, or Firm* — Barnes & Thornburg LLP (57) ABSTRACT

A heat exchanger includes a first tube extending along a central axis. The first tube defines a chamber that contains a first medium. A corrugated sheath of the heat exchanger is disposed radially outward from and extends circumferentially about the outer face for transferring heat through the inner tube.

22 Claims, 7 Drawing Sheets

(51) Int. Cl.
*A23G 9/28* (2006.01)
*F28F 1/10* (2006.01)
*F28F 1/38* (2006.01)
*A23G 9/12* (2006.01)

(56) References Cited

U.S. PATENT DOCUMENTS

| | | | | |
|---|---|---|---|---|
| 4,284,133 A | * | 8/1981 | Gianni | F28D 7/106 |
| | | | | 165/133 |
| 4,305,457 A | * | 12/1981 | Cozzolino | F28F 1/105 |
| | | | | 165/154 |
| 4,635,707 A | | 1/1987 | Gentry | |
| 5,201,861 A | * | 4/1993 | Menzel | A23G 9/045 |
| | | | | 62/135 |
| 5,435,155 A | | 7/1995 | Paradis | |
| 6,253,573 B1 | | 7/2001 | Schwitters et al. | |
| 7,191,824 B2 | | 3/2007 | Wu et al. | |
| 8,474,515 B2 | | 7/2013 | Burgers et al. | |
| 2005/0109493 A1 | * | 5/2005 | Wu | F02B 29/0462 |
| | | | | 165/157 |
| 2007/0151101 A1 | * | 7/2007 | Cocchi | A23G 9/22 |
| | | | | 29/890.03 |
| 2010/0269534 A1 | | 10/2010 | Kumakiri et al. | |
| 2014/0305618 A1 | * | 10/2014 | Newton | A23G 9/045 |
| | | | | 165/154 |
| 2015/0330682 A1 | | 11/2015 | Dong et al. | |

FOREIGN PATENT DOCUMENTS

| | | |
|---|---|---|
| CN | 102802432 A | 11/2012 |
| EP | 1787525 | 5/2007 |
| GB | 732468 | 6/1955 |
| GB | 980412 | 1/1965 |
| IT | 1264390 | 9/1996 |
| IT | 1274677 | 7/1997 |
| JP | S55158496 A | 12/1980 |
| JP | 2003 307396 A | 10/2003 |

OTHER PUBLICATIONS

Third Party Observation submitted during International phase for priority application PCT/US2017/036491, dated Sep. 17, 2018, 4 pages (references cited above).

English translation of Search Report for Chinese Patent Application No. 201780042761.5, dated Nov. 23, 2019, 2 pages (references cited above).

* cited by examiner

CYLINDRICAL HEAT EXCHANGER

CROSS-REFERENCE TO RELATED APPLICATIONS

This application is a U.S. national stage application under 35 U.S.C. § 371 of PCT/US2017/036491, filed on Jun. 8, 2017, which claimed priority from U.S. Provisional Application No. 62/347,949, filed on Jun. 9, 2016, the entirety of which are each hereby fully incorporated by reference herein.

BACKGROUND

The present disclosure relates to a cylindrical heat exchanger, and more particularly, to a cylindrical heat exchanger for exchanging heat between two flowing mediums.

A semi-frozen product dispensing apparatus is one application for a cylindrical heat exchanger applied as the evaporator of a refrigeration unit of the dispensing apparatus. Such evaporators are typically constructed of an inner tube that defines an inner pathway for the flow of the semi-frozen product, and an outer tube concentrically located about the inner tube. The inner and outer tubes define an annular flow path for the flow of a refrigerant. As the product flows through the inner pathway, heat is transferred from the product, through the inner tube and into the refrigerant. Improvements in heat transfer efficiency, and/or, simplification and a reduction in manufacturing costs is desirable for cylindrical heat exchangers, whether or not such heat exchangers are applied to a semi-frozen product dispensing apparatus.

SUMMARY

A heat exchanger according to one, non-limiting, embodiment of the present disclosure includes a first tube extending along a central axis and defining a chamber that contains a first medium; and a corrugated sheath disposed radially outward from and extending circumferentially about the outer face.

Additionally to the foregoing embodiment, the heat exchanger includes a second tube disposed concentrically to and radially outward from the first tube, and wherein a pathway is defined between the first and second tubes for flowing a second medium, and the corrugated sheath is in the pathway.

In the alternative or additionally thereto, in the foregoing embodiment, the chamber is cylindrical in shape and the pathway is annular in shape.

In the alternative or additionally thereto, in the foregoing embodiment, the second medium is a refrigerant.

In the alternative or additionally thereto, in the foregoing embodiment, the corrugated sheath is a ribbon spiraled about the first tube.

In the alternative or additionally thereto, in the foregoing embodiment, the ribbon includes a plurality of windings with each winding including a plurality of corrugations, and wherein the plurality of corrugations of a winding of the plurality of windings are circumferentially misaligned with the plurality of corrugations of an adjacent winding of the plurality of windings.

In the alternative or additionally thereto, in the foregoing embodiment, the heat exchanger is an evaporator.

A semi-frozen product dispensing apparatus according to another, non-limiting, embodiment includes a refrigeration unit including a freezing cylinder as an evaporator, the freezing cylinder including an inner tube extending along a central axis and defining a chamber containing a product to be cooled, an outer cylinder concentrically disposed to and spaced radially outward from the inner tube, an annular pathway defined by the inner and outer tube for flowing a refrigerant, and a corrugated sheath disposed in the annular pathway for creating turbulence in the flow of the refrigerant.

Additionally to the foregoing embodiment, the flow of refrigerant is generally uniformly distributed around the inner tube.

In the alternative or additionally thereto, in the foregoing embodiment, the corrugated sheath circumferentially extends continuously about the inner tube.

In the alternative or additionally thereto, in the foregoing embodiment, the corrugated sheath is a corrugated ribbon spiraled about the inner tube.

In the alternative or additionally thereto, in the foregoing embodiment, the corrugated ribbon includes a plurality of corrugations with each corrugation equally spaced from the next adjacent corrugation.

In the alternative or additionally thereto, in the foregoing embodiment, the corrugated ribbon includes and spans laterally between opposite edges, and each corrugation of the plurality of corrugations extend between and are substantially normal to the opposite edges.

In the alternative or additionally thereto, in the foregoing embodiment, the inner tube is cylindrical.

In the alternative or additionally thereto, in the foregoing embodiment, the outer tube is cylindrical.

In the alternative or additionally thereto, in the foregoing embodiment, the inner tube is made of stainless steel and the corrugated sheath is made of a copper alloy.

A method of manufacturing a heat exchanger according to another, non-limiting, embodiment includes corrugating a ribbon; spiraling the ribbon about an inner tube; and inserting the inner tube and the ribbon into an outer tube.

Additionally to the foregoing embodiment, the method includes adhering the ribbon to the inner tube.

In the alternative or additionally thereto, in the foregoing embodiment, the ribbon is made of a copper alloy and the inner tube is made of stainless steel.

In the alternative or additionally thereto, in the foregoing embodiment, the heat exchanger is an evaporator.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
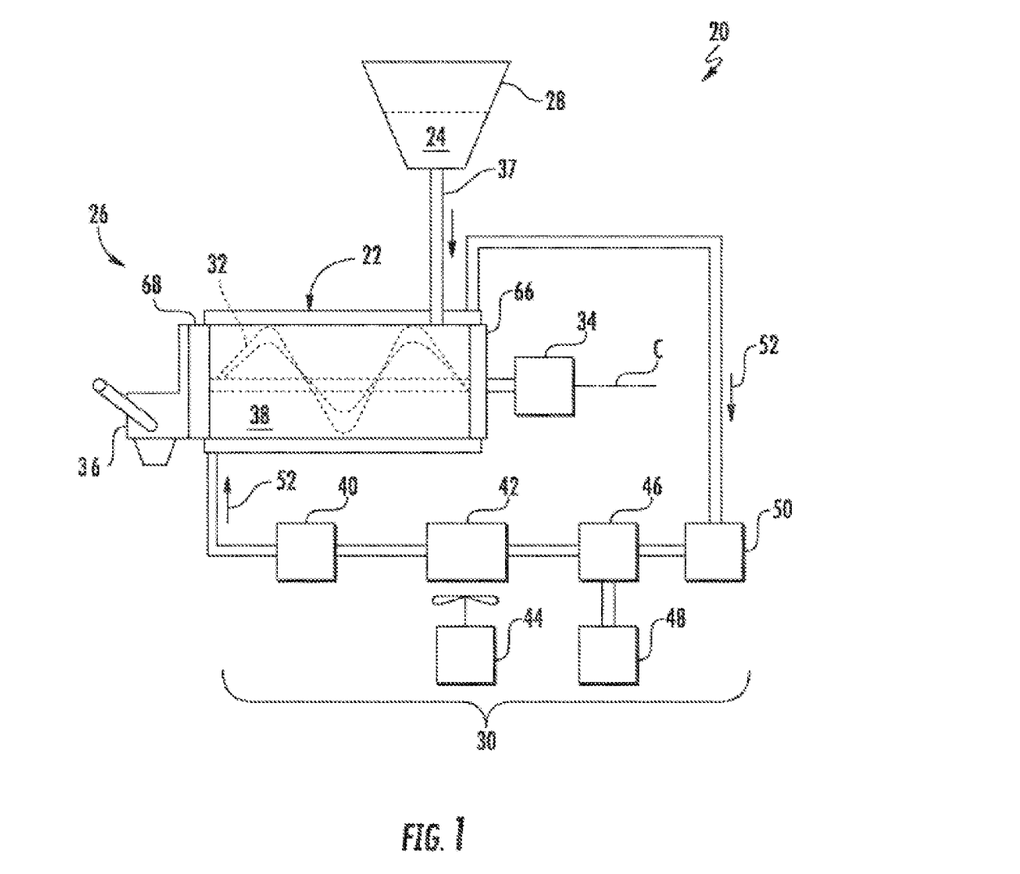
FIG. 1 is a schematic of a semi-frozen product dispensing apparatus of the present disclosure.

Referring to FIG. 1, semi-frozen product dispensing apparatus 20 is illustrated as one, non-limiting, application of a heat exchanger 22 utilized as an evaporator. The semi-frozen product dispensing apparatus 20 may freeze and dispense a semi-frozen food product 24. Non-limiting examples of a food product may include soft-serve ice cream, yogurt, custard, shakes, carbonated and/or non-carbonated ice slush drinks and other products. It is further contemplated and understood that the product may not be edible and instead may be any product in various forms (i.e., gas, liquid, semi-solid) that may benefit from being cooled and/or heated to various, controlled, degrees.

The semi-frozen product dispensing apparatus 20 may include a dispensing assembly 26, a product hopper or storage bin 28, and a refrigeration unit 30. The heat exchanger 22 is generally integrated into the dispensing assembly 26. The dispensing assembly 26 dispenses the product 24 in the desired, chilled, form, and may include a beater or paddle 32, an electric motor 34 and a dispensing valve 36. The beater 32 may be coaxially disposed and mounted for rotation within a freezing chamber or pathway 38 of the heat exchanger 22. The motor 34 may drive the beater 32 about a center axis C to work the product 24 in a manner well known in the art. The dispensing valve 36 may be selectively operated for dispensing the semi-frozen product from the heat exchanger 22. The product hopper 28 may store the product 24 at an acceptable temperature and consistency (e.g., liquid form) for controlled delivery through a supply conduit 37 to the heat exchanger 22.

The refrigeration unit 30 may include the heat exchanger 22 (utilized as an evaporator in the present embodiment), a flow control valve 40, a condenser 42, an associated condenser motorized fan 44, a compressor 46, an associated compressor motor 48, and an accumulator 50. Operation of the refrigeration unit 30 may best be understood by starting at the compressor 46, where a first suction gas (i.e., heat transfer fluid that may be a refrigerant, see arrows 52) enters the compressor 46 and is compressed to a higher temperature and pressure. The pressurized refrigerant 52, in a gas state, is emitted from the compressor 46 and may then flow into an arrangement of tubes (not shown) of the condenser 42. Air flowing across a plurality of condenser coil fins (not shown) and the tubes, cools the refrigerant 52, in the gas state, to its saturation temperature. The air flow across the fins and tubes of the condenser 42 may be facilitated by the motorized condenser fan 44.

Through the removal of latent heat from the refrigerant 52 by the condenser 42, the refrigerant is condensed to a high pressure and high temperature liquid. The liquid refrigerant may then controllably flow through the flow control valve 40 (i.e., expansion valve) and into the evaporator 22. As the liquid refrigerant 52 passes through internal orifice(s) of the control valve 40, some of the liquid vaporizes into a gas (i.e., flash gas). The refrigerant 52, in both gas and liquid states, flows over heat transfer surfaces within the evaporator 22 that separates the refrigerant 52 from the product 24. As the refrigerant 52 flows over the heat transfer surfaces, the product 24 flows over opposite surfaces of the elements. Heat is then transferred from the product 24, through the elements, and is absorbed by the refrigerant 52. As heat is absorbed, the remaining refrigerant 52 in the liquid state is typically vaporized. It is contemplated and understood that other components of a refrigeration unit that are well known in the art may be employed. It is further contemplated and understood that refrigeration processes may be reversed, with the evaporator 22 functioning as a heat exchanger that heats the product 24 as opposed to cooling the product. Such a reversal in heat transfer capability may benefit the semi-frozen product dispensing apparatus 20 when cleaning the dispensing assembly 26.

Referring to FIGS. 2 through 5, the evaporator 22 of the refrigeration unit 30 may include an inner tube 54, an outer tube 56 and a sheath 58 that may be corrugated. The inner tube 54 may be cylindrical and includes an inner face 60 that defines boundaries of the chamber 38 centered about the axis C. The outer tube 56 may be cylindrical, and is concentric to and disposed radially outward from the inner tube 54. A pathway 62 (see FIG. 5) that may be annular in shape has boundaries radially defined by the outer tube 56 and an outer face 64 of the inner tube 54. The sheath 58 may be generally cylindrical in shape, is disposed in the annular pathway 62, and may be adhered to the outer face 64 of the inner tube 54.

Figure 2:
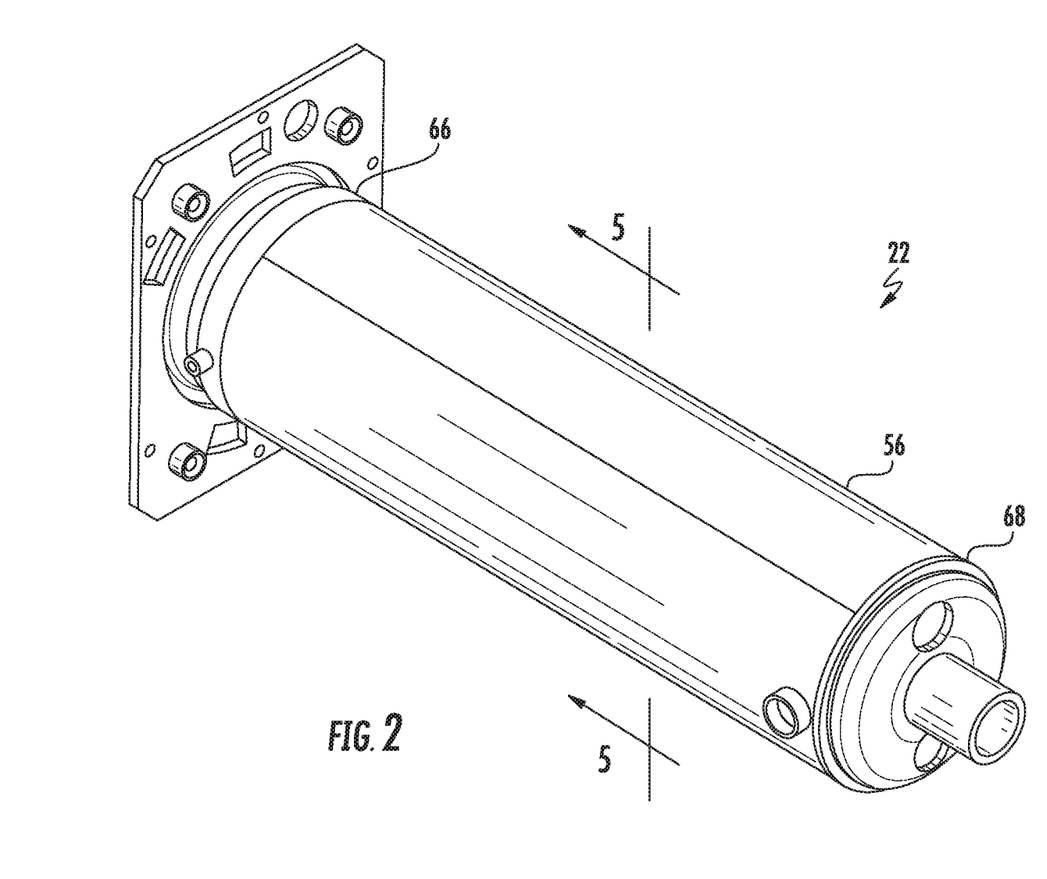
FIG. 2 is a perspective view of a heat exchanger utilized by the semi-frozen product dispensing apparatus as an evaporator.
Figure 3:
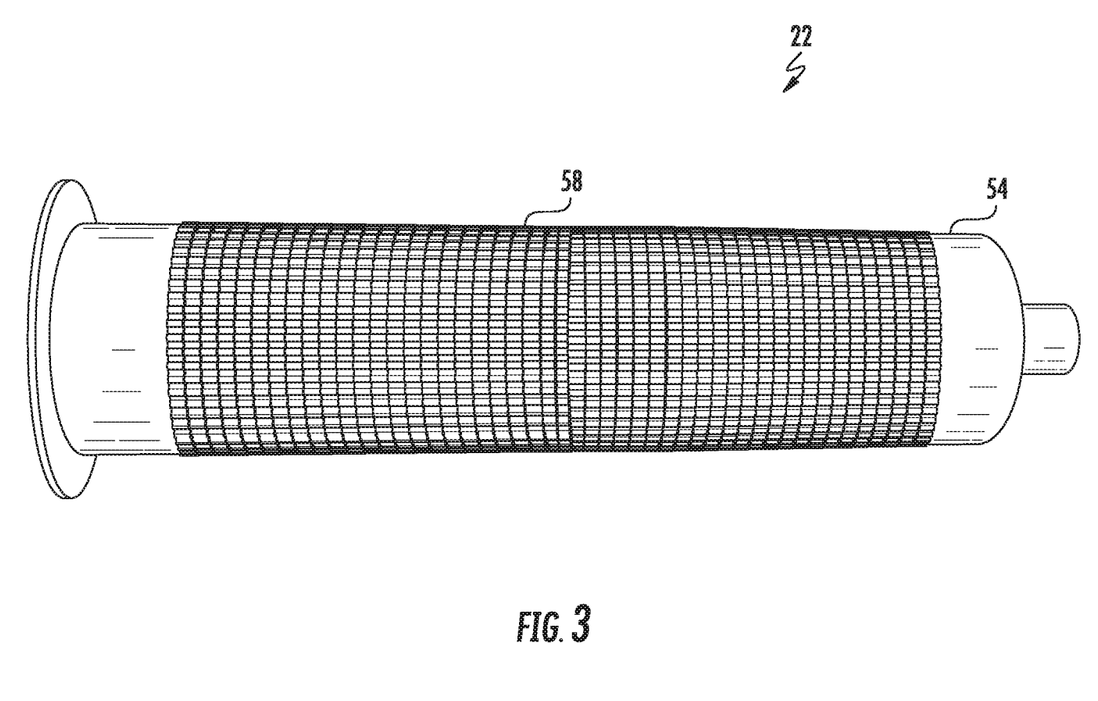
FIG. 3 is a perspective view of the heat exchanger with an outer tube removed to show internal detail.
Figure 4:
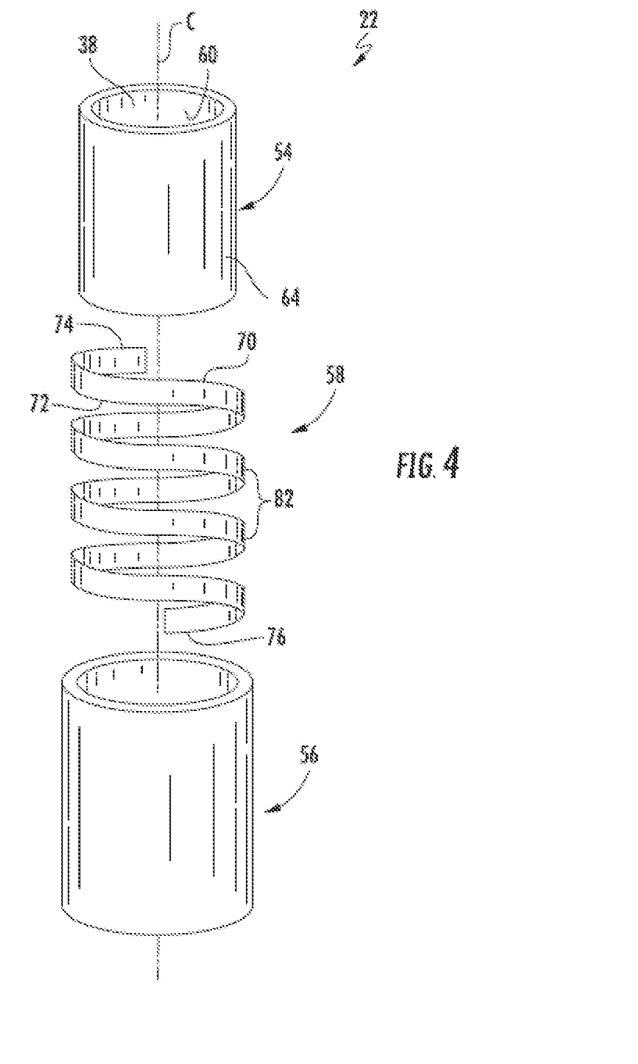
FIG. 4 is an exploded perspective view of the heat exchanger.
Figure 5:
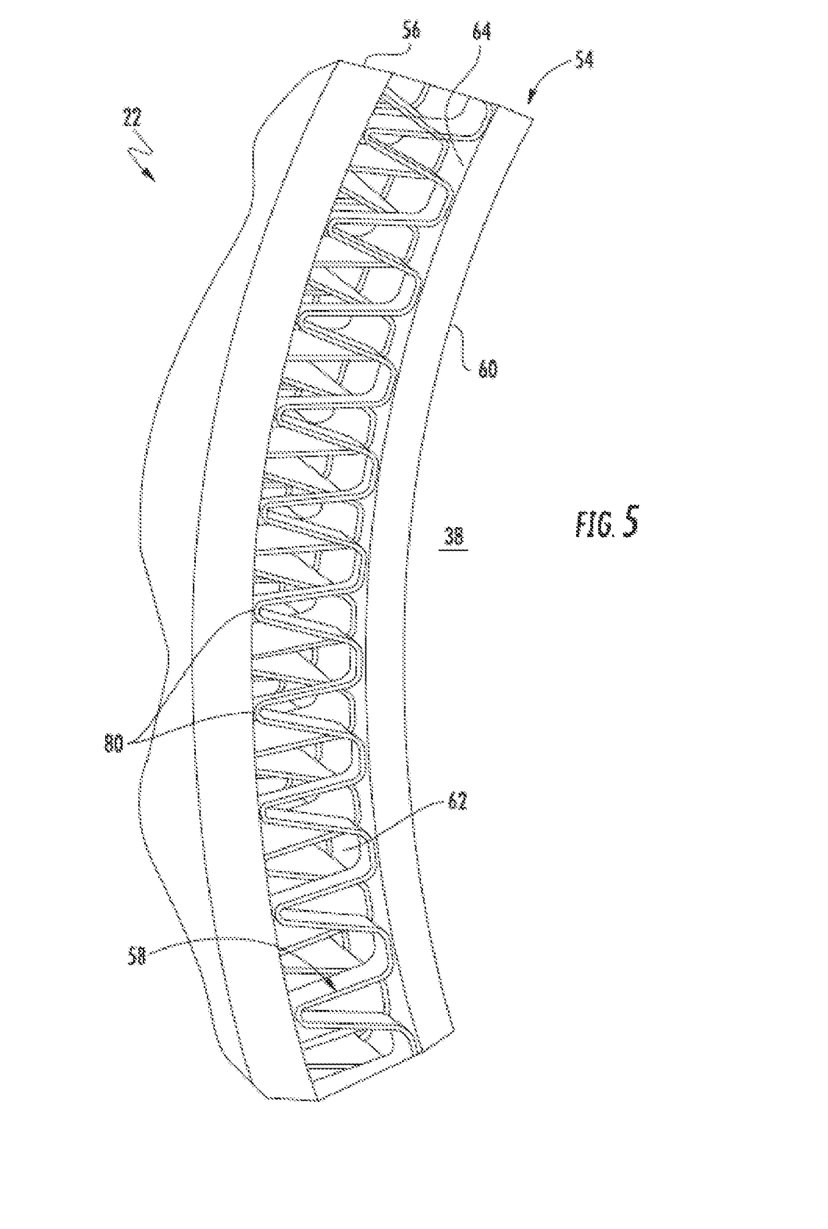
FIG. 5 is a partial, perspective, cross section of the heat exchanger taken along line 5-5 in FIG. 2.
Figure 6:
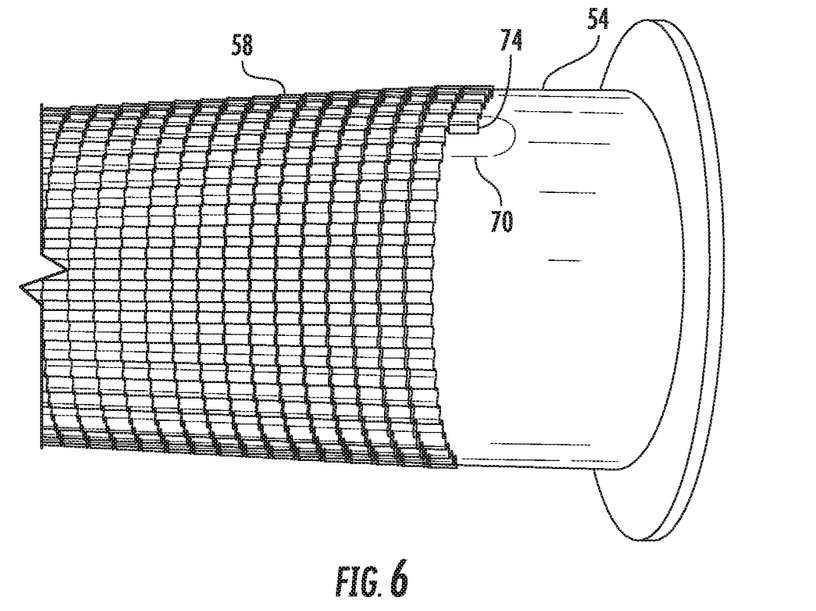
FIG. 6 is a partial perspective side view of the heat exchanger illustrating a solder connection.
Figure 7:
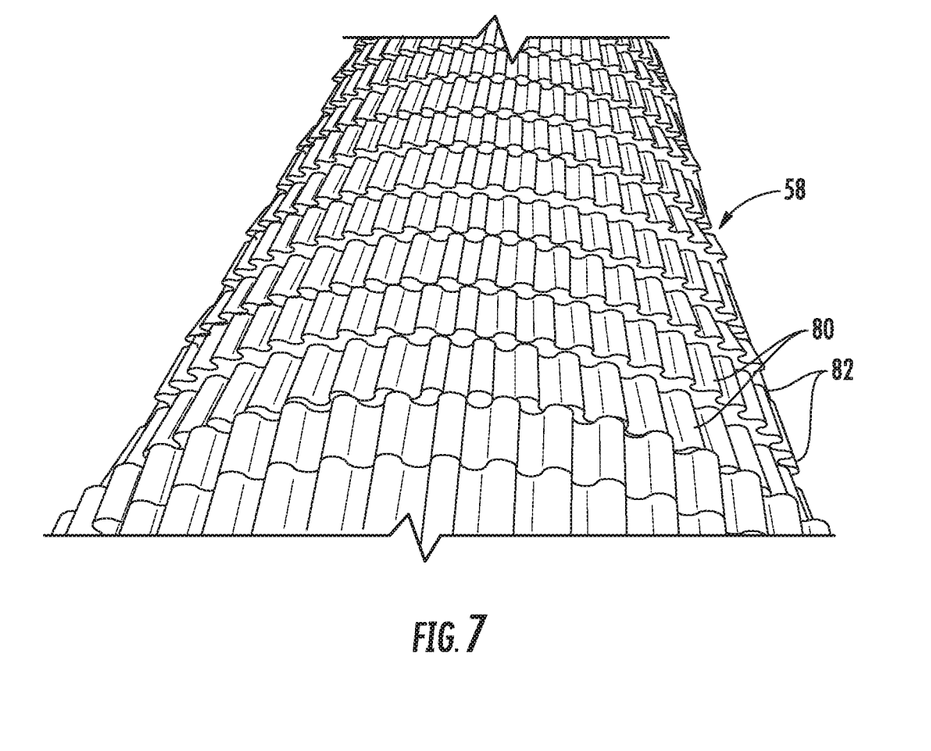
FIG. 7 is a partial perspective side view of the heat exchanger illustrating the misalignment between corrugations of a sheath of the heat exchanger.

The evaporator 22 may further include a refrigerant inlet manifold 66 located at one end of the inner and outer tubes 54, 56, and a refrigerant outlet manifold 68 located at an opposite end of the inner and outer tubes 54, 56 (also see FIG. 1). Although not specifically illustrated, the manifolds 54, 56 are constructed and arranged to evenly distribute the refrigerant circumferentially within the annular pathway 62 to optimize heat transfer efficiency.

Referring to FIGS. 4 through 7, the sheath 58 may be in the form of a ribbon that, during manufacturing, is spiraled about the outer face 64 of the inner tube 54. The ribbon 58 has opposite longitudinal edges 70, 72 that extend between opposite ends 74, 76 of the ribbon 58. The ribbon 58 may be adhered to the outer face 64 of the inner tube 54 via a connection 78 at each end 74, 76 (see FIG. 6). One example of the connection 78 may be a soldered connection. The ribbon 58 may further include a plurality of corrugation 80 (e.g., in the shape of a wave form) with each corrugation being substantially normal to and extending between the opposite edges 70, 72 of the ribbon 58. It is further contemplated and understood that a substantial portion or the entire outer face 64 of the inner tube 54 may be coated with an adhesive or solder thereby securing about the entire 58 ribbon contact area to the outer face 64. Alternatively, the contact area(s) of the ribbon 58 may be coated with an adhesive or solder for direct attachment to the outer face 64.

When the evaporator 22 is assembled, the ribbon 22 forms a plurality of windings 82 each including a multitude of corrugations 80 forming a turbulent flowpath that may be micro-channels. The ribbon edge 70 of one winding 82 is directly adjacent to and may be in contact with the opposite ribbon edge 72 of the adjacent winding 82. To produce turbulence in the flow of the refrigerant 52, thereby enhancing thermal transfer efficiency, the corrugations 80 of one winding 82 may be circumferentially misaligned with the corrugations 80 of the adjacent winding 82 (see FIG. 7).

The material of the inner and outer tubes 54, 56 may be stainless steel or other material which may come in contact with beverage and/or food products and also has a high heat transfer coefficient. The material of the sheath 58 may be a copper alloy.

In operation, the refrigerant 52 enters the annular pathway 62 via the inlet manifold 66 and is thereby evenly distributed circumferentially about the inner tube 54. The refrigerant 52 then flows generally axially through the annular pathway 62 (i.e., between the inner and outer tubes 54, 56) as the refrigerant passes through, over and around the corrugations 80 of each successive winding 82 creating turbulent flow. That is, each winding 82 of the ribbon 58 and the resulting misaligned corrugations 80 from one winding 82 to the next acts to divide and recombine the axial flow repeatedly, thus contributing toward the turbulent flow. The refrigerant then collects at the outlet manifold 68 for return to the compressor 46. It is contemplated and understood that the manifolds 66, 68 facilitate a distributed flow about the annular pathway 62; however, means other than manifolds may be applied to achieve a desired flow distribution.

Figure 8:
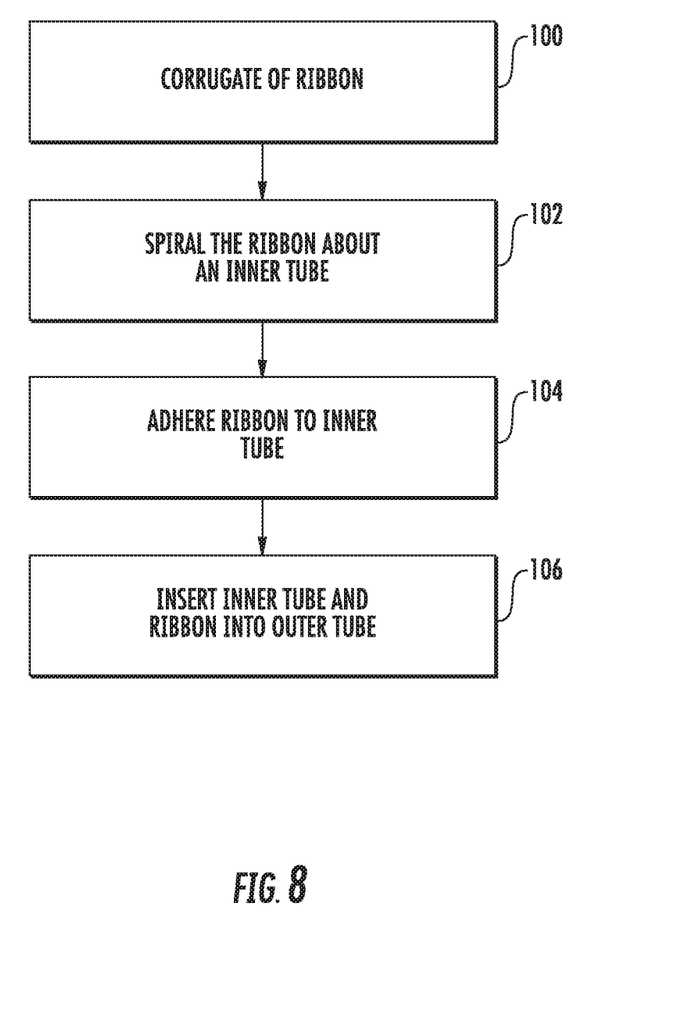
FIG. 8 is a flow diagram of a method of manufacturing the heat exchanger.

Referring to FIG. 8, a process of manufacturing the heat exchanger 22 includes in block 100 corrugating a ribbon 58. One, non-limiting, method of corrugating the ribbon 58 may be through a stamping process. In block 102, the ribbon is spiraled about an inner tube 54 that may define a freezing chamber 38. Per block 104, the ribbon 58 is adhered to the inner tube 54. One, non-limiting, example of adherence may be soldering opposite ends of the ribbon 58 to an outer face 64 of the inner tube 54. In some soldering applications, the solder may be first added to the outer face 64 before the ribbon is spiraled about the inner tube 54. In block 106, the inner tube 54 with the adhered ribbon 58 may be inserted into an outer tube 106 thereby capturing the ribbon 58 within the annular pathway 62.

The outer tube 106 may be a formed cylinder, with the inner tube 54 inserted into the outer tube 106 by pushing, or, the outer tube 106 may be a wrapped jacket that is formed around the inner tube 54.

Benefits and advantages of the present disclosure include a heat exchanger 22 that induces turbulent flow by design which yields an efficient transfer of energy from the refrigerant 52 resulting in a more efficient heat exchanger.

While the present disclosure is described with reference to illustrated embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A semi-frozen product dispensing apparatus, comprising:
    a dispensing assembly, a product hopper, and a heat exchanger, the dispensing assembly dispenses a product that has been cooled within a chamber provided within a first tube of the heat exchanger, the product remains within the first tube while being cooled;
    the heat exchanger comprises the first tube extending along a central axis of the heat exchanger;
    a corrugated sheath disposed radially outward from and extending circumferentially about an outer face of the first tube, the corrugated sheath is cylindrical and is a ribbon spiraled about the first tube, the ribbon includes a plurality of windings that each extend around the first tube and are adhered to the outer face of the first tube, with each winding including a plurality of corrugations, the plurality of corrugations of a first winding of the plurality of windings are circumferentially misaligned with the plurality of corrugations of an adjacent winding of the plurality of windings, wherein a longitudinal edge of the first winding contacts a second longitudinal edge of the adjacent winding, and wherein the corrugated ribbon spans laterally between opposite edges; and
    a second tube disposed concentrically to and radially outward from the first tube, wherein an annular pathway is defined between the first tube and the second tube for flowing a second medium, the corrugated sheath is in the annular pathway, the second medium is a refrigerant, wherein the pathway is oriented to direct the flowing second medium to flow axially through the annular pathway by passing over and around the plurality of corrugations along the annular pathway.

2. The semi-frozen product dispensing apparatus set forth in claim 1, wherein the flow of refrigerant is generally uniformly distributed around the first tube.

3. The semi-frozen product dispensing apparatus set forth in claim 1, wherein each corrugation equally spaced from the next adjacent corrugation.

4. The semi-frozen product dispensing apparatus set forth in claim 3, wherein each corrugation of the plurality of corrugations extend between and are substantially normal to the opposite edges.

5. The semi-frozen product dispensing apparatus set forth in claim 1, wherein the first tube is cylindrical.

6. The semi-frozen product dispensing apparatus set forth in claim 5, wherein the second tube is cylindrical.

7. The semi-frozen product dispensing apparatus set forth in claim 1, wherein the first tube is made of stainless steel and the corrugated sheath is made of a copper alloy.

8. The semi-frozen product dispensing apparatus in claim 1, and wherein the corrugations of the first winding and the corrugations of the adjacent winding form micro-channels that traverse the corrugated ribbon, the micro-channels traverse the longitudinal edges.

9. The semi-frozen product dispensing apparatus in claim 1, wherein the first tube is configured to receive the product from a supply conduit into the chamber, the chamber is configured to cool the product into a semi-frozen product, the first tube is further configured to dispense the semi-frozen product.

10. The semi-frozen product dispensing apparatus in claim 1, wherein the second tube comprises a refrigerant inlet and a refrigerant outlet.

11. The semi-frozen product dispensing apparatus in claim 1, wherein the chamber further comprises a beater configured to move rotationally along the central axis, the beater is configured to move the product within the chamber, the beater is further configured to be driven by an external motor.

12. The semi-frozen product dispensing apparatus of claim 1, wherein an inner surface of the second tube contacts each of the plurality of windings that extend around the first tube.

13. The semi-frozen product dispensing apparatus of claim 1, wherein the chamber is cylindrical in shape.

14. The semi-frozen product dispensing apparatus of claim 1, wherein the heat exchanger is an evaporator.

15. A method of manufacturing a frozen product dispensing apparatus comprising:
   providing a dispensing assembly, a product hopper, and a heat exchanger, the dispensing assembly dispenses a product that has been cooled within a chamber provided within a heat exchanger, wherein the heat exchanger is configured such that the product remains within a first tube of the heat exchanger while being cooked by a refrigeration system that causes refrigerant to flow over surfaces of the heat exchanger;
   providing a first tube that extends along a central axis of the heat exchanger;
   forming a corrugated sheath radially outward from the first tube, the corrugated sheath formed by wrapping an elongated corrugated ribbon about an outer face of the first tube to establish a plurality of windings that each are adhered to the outer face of the first tube, wherein the elongated corrugated ribbon spans laterally between opposite first and second edges, wherein the plurality of windings are wrapped such that the plurality of corrugations upon a winding are circumferentially misaligned the plurality of corrugations of an adjacent winding of the plurality of windings, wherein the elongated corrugated ribbon is wrapped about the outer face of the first tube such that the first longitudinal edge of the first winding contacts the second longitudinal edge of the adjacent winding;
   disposing a second tube concentrically to and radially outward from the first tube to establish an annular pathway between the first and second tube for flowing a refrigerant therethrough, wherein the corrugated sheath is disposed within the annular pathway, the annular pathway is oriented to direct the flowing refrigerant medium to flow axially through the annular pathway by passing over and around the plurality of corrugations along the annular pathway.

16. The method of manufacturing a frozen product dispensing apparatus of claim 15, wherein each corrugation disposed upon the ribbon is equally spaced from the next adjacent corrugation.

17. The method of manufacturing a frozen product dispensing apparatus of claim 15, wherein the first tube is configured to receive the product from a supply conduit into the chamber, the chamber is configured to cool the product into a semi-frozen product, the first tube is further configured to dispense the semi-frozen product.

18. The method of manufacturing a frozen product dispensing apparatus of claim 15, further comprising the step of forming a refrigerant inlet and a refrigerant outlet in the second tube.

19. The method of manufacturing a frozen product dispensing apparatus of claim 15, further comprising providing a beater within the chamber, the beater is configured to move rotationally along a central axis, the beater is configured to move the product within the chamber, the beater is further configured to be driven by an external motor.

20. The method of manufacturing a frozen product dispensing apparatus of claim 15, wherein an inner surface of the second tube is positioned in contact with each of the plurality of windings that extend around the first tube.

21. The method of manufacturing a frozen product dispensing apparatus of claim 15, wherein the ribbon extends between opposite ends and both of the opposite ends of the ribbon are adhered to the outer face of the first tube with a soldered connection.

22. The method of manufacturing a frozen product dispensing apparatus of claim 21, wherein the ribbon is affixed to the inner tube with an adhesive.

\* \* \* \* \*

UNITED STATES PATENT AND TRADEMARK OFFICE
CERTIFICATE OF CORRECTION

PATENT NO. : 11,118,841 B2
APPLICATION NO. : 16/307365
DATED : September 14, 2021
INVENTOR(S) : Minard Page 1 of 1

It is certified that error appears in the above-identified patent and that said Letters Patent is hereby corrected as shown below:

In the Claims

Column 7, Claim 15, Line 9 should read:
--cooled by a refrigeration system that causes refrigerant--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*